United States Patent [19]

Stinson

[11] 3,903,774
[45] Sept. 9, 1975

[54] CUT-OFF ATTACHMENT FOR A POWER HAND SAW

[76] Inventor: Robert J. Stinson, 27620 Godard Rd., Romulus, Mich. 48174

[22] Filed: Jan. 4, 1974

[21] Appl. No.: 430,886

[52] U.S. Cl. .................. 83/471.2; 83/467; 83/487; 83/745
[51] Int. Cl. ............................ B27b 9/04; B27b 5/18
[58] Field of Search ....... 83/471.2, 477.2, 489, 467, 83/487, 745

[56] References Cited
UNITED STATES PATENTS

| | | | |
|---|---|---|---|
| 1,561,477 | 11/1925 | Miller | 83/471.2 |
| 2,933,113 | 4/1960 | Meyer | 83/471.2 |
| 3,645,306 | 2/1972 | Adams | 83/477.2 |
| 3,751,816 | 8/1973 | Hayes | 83/471.2 |

Primary Examiner—J. M. Meister
Assistant Examiner—Leon Gilden
Attorney, Agent, or Firm—Adolph G. Martin

[57] ABSTRACT

A cut-off attachment for a power hand saw having a flat platform slidably mounted on an elongated member having therein an upwardly disposed longitudinal channel. A coiled spring is supported on a pin which is secured on each end in a bracket mounted on the flat platform. The outer end of the coiled spring is located in the upwardly disposed longitudinal channel, and detachably connected to the elongated member. A lateral locator bar on the elongated member has thereon a stop providing a fully retracted position for the flat platform. A conventional power hand saw is mountable on the flat platform, for use in conjunction with the cut-off attachment, thereby enabling transverse cuts to be accurately made without resort to a carpenter's square or other similiar device.

6 Claims, 5 Drawing Figures

PATENTED SEP 9 1975  3,903,774
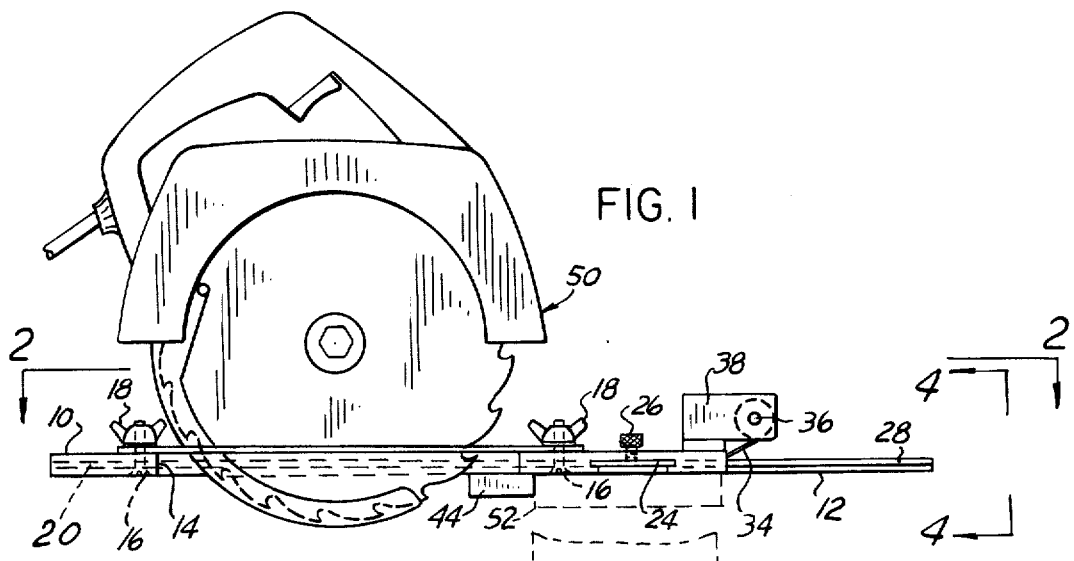
FIG. 1
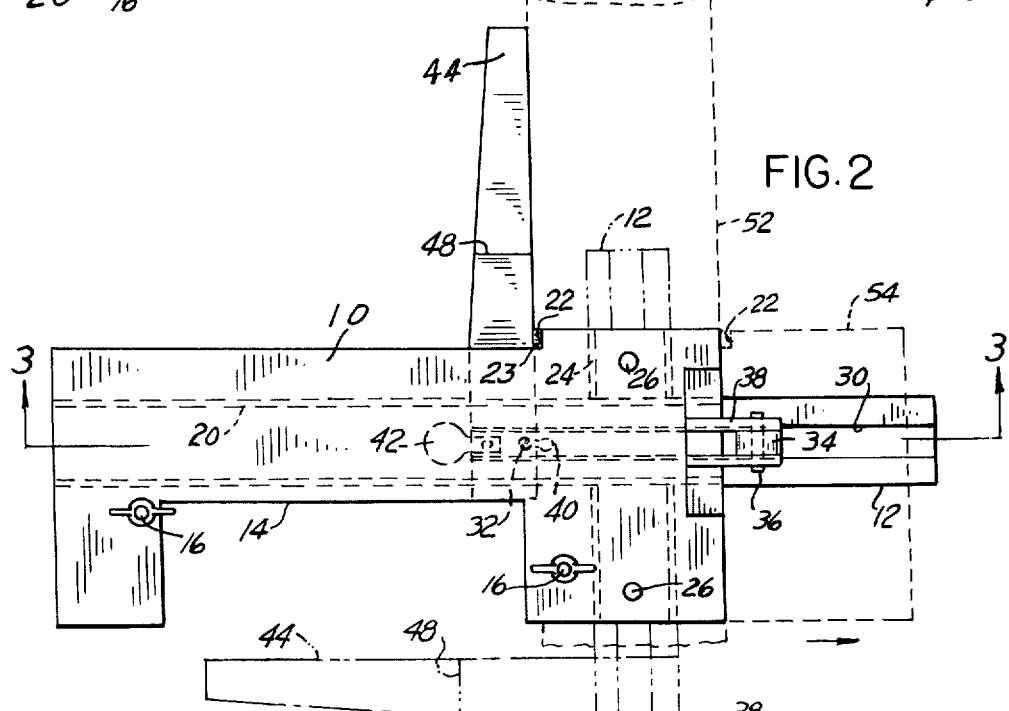
FIG. 2
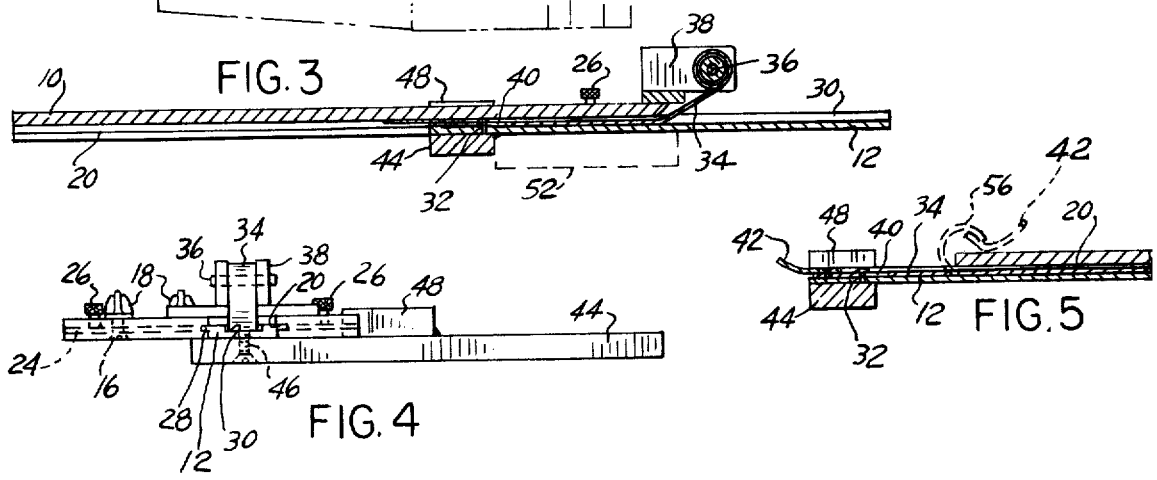
FIG. 3
FIG. 4
FIG. 5

CUT-OFF ATTACHMENT FOR A POWER HAND SAW

BACKGROUND OF THE INVENTION

This invention relates generally to attachments for use in combination with portable power hand saws and routers, but more particularly to an attachment for use with circular blade power hand saws, saber saws and routers. Most such attachments presently in use are structurally complex, and consequently costly to produce, and cumbersome to manipulate. Fully cognizant of this fact, the applicant has devised a simply constructed, relatively inexpensive, light-weight attachment for power hand saws and routers, which will enable them to be used more efficiently and effectively.

SUMMARY OF THE INVENTION

This invention consists of a flat platform 10 slidably mounted on an elongated member 12 having therein an upwardly disposed longitudinal channel 30. A flat coiled spring 34 is supported on a pintle 36, which is secured on each end in a bracket 36 mounted on the flat platform 10. The outer end of the flat coiled spring 34 is located in the upwardly disposed longitudinal channel 30, and detachably connected to the elongated member 12. A lateral locator bar 44 on the elongated member 12 has thereon a block 48 for stopping the flat platform 10 when it reaches a fully retracted position on the elongated member 12. A pair of screws 16 with wing nuts 18, are provided in the flat platform 10, for detachably mounting thereon a conventional power hand saw or router.

BRIEF DESCRIPTION OF THE DRAWINGS

FIG. 1 is a side elevation view of the applicant's invention, showing a power hand saw 50 attached to the flat platform 10.

FIG. 2 is a top plan view, taken substantially on plane 2—2 in FIG. 1, with the power hand saw 50 removed, showing structural details of the elongated member 12 and the flat platform 10.

FIG. 3 is a section view, taken substantially on plane 3—3 in FIG. 2, showing the connection between the flat coiled spring 34 and the elongated member 12.

FIG. 4 is an elevation view, taken substantially on plane 4—4 in FIG. 1, showing the characteristic shape of the elongated member 12 and the longitudinal slotted way 20 in the flat platform 10.

FIG. 5 is a fragmentary section view, similar to FIG. 3, showing the flat platform 10 in an advanced position on the elongated member 12, and the detached position 56 of the flat coiled spring 34.

CONSTRUCTION

For a more detailed description of the invention, reference is made to the drawing in which numeral 10 designates a flat platform slidably mounted on an elongated member 12. The flat platform 10 has an oblong opening 14 on one edge, and adjacent thereto a pair of upwardly disposed counter-sunk screws 16 provided with wing nuts 18. A slotted longitudinal way 20 is cut in the lower side of the flat platform 10, and a horizontally disposed shoulder 22 is provided on one edge.

A resilient bumper 23 is applied to the horizontally disposed shoulder 22 on the flat platform 10. A transverse slotted way 24, is also cut in the lower side of the flat platform 10, adjacent the forward end. A pair of knurled head set screws 26, threadably engaged in the flat platform 10 are extendable into the transverse slotted way 24. The elongated member 12, having along each side thereof a rib 28, is slidably retained in the longitudinal slotted way 20 in the flat platform 10.

An upwardly disposed longitudinal channel 30 in the elongated member 12, has adjacent the rear end thereof, an upright pin 32. A flat coiled spring 34 is supported on a pintle 36 which is fixed on each end in a bracket 38 mounted on the forward end of the flat platform 10. The outer end of the flat coiled spring 34 is located in the upwardly disposed channel 30, and provided with a slotted opening 40 which is detachably engaged on the upright pin 32. A flexible pull tab 42 is fixed on the outer end of the flat coiled spring 34.

A lateral locator bar 44, attached to the elongated member 12 by a countersunk screw 46, has the upper face thereof in the plane of the lower surface on the flat platform 10. A stop block 48 on the lateral locator bar 44 engages the resilient bumper 23 on the horizontally disposed shoulder 22 to provide a fully retracted position for the flat platform 10 on the elongated member 12.

In practice it may be deemed desirable to attach the lateral locator bar 44 on the elongated member 12 by adjustable means so that the attachment can be used to make transverse cuts at selective angles, rather than at a fixed angle of 90° only, as provided for in the embodiment herein disclosed. Such variations and modifications in structure will however be dictated by the use for which the attachment is to be principally employed.

The preceding discussion completes a description of the structure characterizing the single embodiment of the applicant's invention herein disclosed; however, to facilitate a more thorough and comprehensive understanding of the subject matter, a discussion of the manner in which the attachment is used to fulfill its intended function is immediately hereinafter set forth.

USE AND OPERATION

In use, a conventional power hand saw or router, such as the circular blade saw 50, is mounted on the flat platform 10 of the applicant's attachment, by means of the screws 16 and wing nuts 18, as shown in FIG. 1. The attachment and saw assembly is then placed on a work piece 52, and positioned to bring the lateral locator bar 44 into contact with the inner edge of the work piece 52. The assembly is next moved so as to place the circular blade of the saw 50 at the exact point where the desired cut-off is to be made.

The sow 50 is then manipulated in the customary manner, and forced across the work piece 52 thereby moving the flat platform 10 to the broken line position 54 shown in FIG. 2. This forward movement of the flat platform 10 on the elongated member 12 loads the flat coiled spring 34. Thus when the cut has been completed and the forward force on the saw 50 is released, the flat platform 10 is automatically moved rearwardly on the elongated member 12 by the flat coiled spring 34.

This rearward movement of the flat platform 10 continues until the resilient bumper 23 on the horizontally disposed shoulder 22 engages the stop block 48 at the fully retracted position of the flat platform 10. The flat platform 10 remains in this retracted position on the elongated member 12 until a forward force is again exerted on the saw 50 in the process of making another cross cut.

When it is desired to use the saw 50 to make a rip-cut in a large work piece, such as a sheet of plywood, it is first necessary to disengage the assembled flat platform 10 and saw 50, from the elongated member 12. This is done by first moving the flat platform 10 forward to the approximate position shown in FIG. 5. A pull of sufficient magnitude is then exerted on the flexible pull tab 42 attached to the outer end of the flat coiled spring 34 to position the enlarged portion of the slotted opening 40 therein under the head on the upright pin 32.

The end of the flat coiled spring 34 is then elevated, thereby disconnecting it from the elongated member, whereupon it assumes the broken line position 56. The assembled flat platform 10 and saw 50 can then be placed on the sheet of plywood, not here shown, and used in the customary manner to perform a ripping operation. If the work piece is not excessively wide, the elongated member 12 may be used in conjunction with the assembled flat platform 10 and saw 50, in the manner previously described for making a cross-cut.

This is done by slidably engaging the elongated member 12 in the transverse slotted way 24 in the flat platform 10, and laterally adjusting it so as to place the circular blade of the saw 50 at the exact point where the cut is to be made. The two knurled head set screws 26 in the flat platform 10 are then brought into holding engagement with the elongated member 12 thereby locking it in position.

The saw 50 may then be moved on the work piece thus accurately performing a ripping operation without the necessity of following a marked guide line. In making either a cross or rip cut in work pieces of any size, however, it is never necessary to detach the saw 50 from the flat platform 10. The assembled saw 50 and flat platform 10 can always be used as a unit in the identical manner to that customarily employed when using any conventional power hand saw 50 without any auxillary attachments.

Based upon the foregoing discussion, the applicant is of the opinion that his invention has fulfilled a long-felt need in the field of attachments for power hand saws and routers, and that he has accordingly made a valuable contribution to the related art. The invention, however, was described with reference to the structural details of only a single embodiment, but it will be appreciated by those familiar with the art that the principles involved are susceptible of numerous other practical adaptations.

I therefore claim as new, and desire to secure by Letters Patent:

1. An attachment for power hand saws comprising an elongated member having therein an upwardly disposed longitudinal channel, a platform slidably mounted on the elongated member and having thereon a retracted position, a lateral locator bar on the elongated member extending below the lower surface thereof for positioning the attachment on a work piece, a coiled spring rotatably supported on the platform having the outer end thereof located in the upwardly disposed longitudinal channel and connected to the elongated member, such coiled spring yieldably holding the platform in its retracted position on the elongated member, and means for mounting a power hand saw on the platform.

2. The attachment of claim 1 in which the lower surface on the platform and the elongated member respectively lie in the same plane.

3. The attachment of claim 2 in which the platform has in the lower side thereof a slotted longitudinal way in which the elongated member is slidably engaged.

4. A stop on the lateral locator bar for holdably engaging the platform in its retracted position on the elongated member.

5. The attachment of claim 4 in which the platform has in the lower side thereof a transverse slotted way for slidably receiving therein the elongated member.

6. The attachment of claim 5 in which at least one screw is threaded into the platform so as to extend into the transverse slotted way therein for holdably engaging the elongated member when the same is inserted into such transverse slotted way.

* * * * *